US012608331B1

(12) United States Patent
Liu et al.

(10) Patent No.: US 12,608,331 B1
(45) Date of Patent: Apr. 21, 2026

(54) POWER SUPPLY SYSTEM FOR ADD-IN CARD

(71) Applicant: SUZHOU METABRAIN INTELLIGENT TECHNOLOGY CO., LTD., Suzhou (CN)

(72) Inventors: Tiejun Liu, Suzhou (CN); Jingwei Zhang, Suzhou (CN); Peiqiang Dong, Suzhou (CN); Jun Yang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/146,501

(22) PCT Filed: Aug. 5, 2024

(86) PCT No.: PCT/CN2024/109729
§ 371 (c)(1),
(2) Date: Jul. 8, 2025

(87) PCT Pub. No.: WO2025/138811
PCT Pub. Date: Jul. 3, 2025

(30) Foreign Application Priority Data

Dec. 27, 2023 (CN) .......................... 202311824906.0

(51) Int. Cl.
*G06F 13/40* (2006.01)
*H02M 1/00* (2006.01)
(Continued)

(52) U.S. Cl.
CPC ...... *G06F 13/4081* (2013.01); *H02M 1/0006* (2021.05); *H02M 1/36* (2013.01); *H02M 3/157* (2013.01); *G06F 2213/0026* (2013.01)

(58) Field of Classification Search
CPC ........ G06F 13/4081; G06F 2213/0026; H02M 1/0006; H02M 1/36; H02M 3/157
See application file for complete search history.

(56) References Cited

U.S. PATENT DOCUMENTS 6,327,635 B1    12/2001  Alston et al.

FOREIGN PATENT DOCUMENTS

CN          102521109 B  *  1/2016
CN          106484578 A      3/2017
(Continued)

OTHER PUBLICATIONS

Translation of CN-102521109-B (Year: 2016).*
Translation of CN-108131318-A (Year: 2018).*
Translation of CN-109240972-A (Year: 2019).*

*Primary Examiner* — Henry Tsai
*Assistant Examiner* — John B Roche
(74) *Attorney, Agent, or Firm* — IPro, PLLC

(57) ABSTRACT

A power supply system for an add-in card is provided. The system includes a motherboard device mounted on a host device, a baseboard management controller configured on the motherboard device, and a microcontroller unit configured on the add-in card, the add-in card is configured on the host device, and the baseboard management controller is connected to the microcontroller unit via a system management bus; the power supply system is configured to control the microcontroller unit to send working voltage parameters for the add-in card to the baseboard management controller when the host device carrying the motherboard device is not turned on; and the baseboard management controller is configured to receive the working voltage parameters and select a power supply type for the add-in card, and control the motherboard device to supply power to the add-in card based on the power supply type when the host device is turned on.

20 Claims, 5 Drawing Sheets

(51) Int. Cl.
   *H02M 1/36*      (2007.01)
   *H02M 3/157*     (2006.01)

(56)             References Cited

FOREIGN PATENT DOCUMENTS

| | | | | |
|---|---|---|---|---|
| CN | 108131318 | A | * 6/2018 | ........... F04D 27/004 |
| CN | 109240972 | A | * 1/2019 | ......... G06F 13/4282 |
| CN | 109917891 | A | 6/2019 | |
| CN | 110515442 | A | 11/2019 | |
| CN | 111966618 | A | 11/2020 | |
| CN | 113687707 | A | 11/2021 | |
| CN | 115543037 | A | 12/2022 | |
| CN | 115941464 | A | 4/2023 | |
| CN | 116662232 | A | 8/2023 | |
| CN | 116841370 | A | 10/2023 | |
| CN | 117472163 | A | 1/2024 | |
| WO | 2023029040 | A1 | 3/2023 | |

* cited by examiner

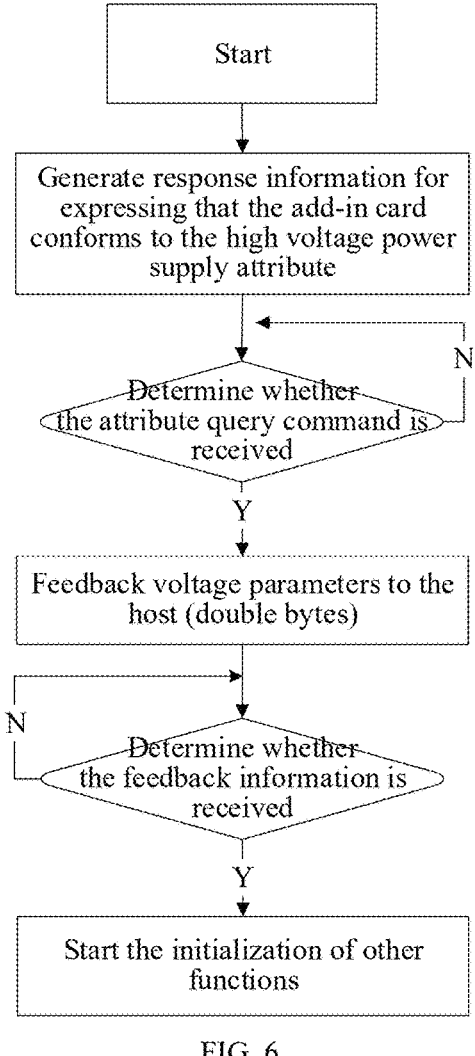

Start

↓

Generate response information for expressing that the add-in card conforms to the high voltage power supply attribute

↓

Determine whether the attribute query command is received ──N──┐

│Y

↓

Feedback voltage parameters to the host (double bytes)

↓

Determine whether the feedback information is received ──N──┐

│Y

↓

Start the initialization of other functions

FIG. 6

| | |
|---|---|
| Microcontroller unit sends working voltage parameters for an add-in card to a baseboard management controller when a host device carrying a motherboard device is not turned on | 701 |
| The baseboard management controller selects a power supply type for the add-in card in response to receiving the working voltage parameters | 702 |
| The baseboard management controller controls the motherboard device to supply power to the add-in card based on the power supply type when the host device is turned on | 703 |

FIG. 7

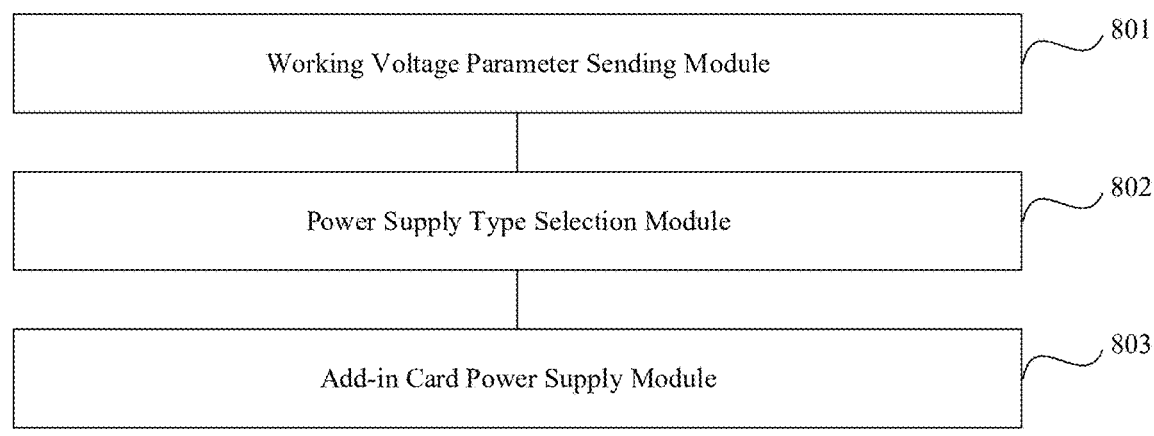

| Working Voltage Parameter Sending Module | 801 |

| Power Supply Type Selection Module | 802 |

| Add-in Card Power Supply Module | 803 |

911
901 — Radio Frequency Unit
902 — Network Module
903 — Audio Output Unit

Power Supply

910

909 — Memory
  Application Program
  Operating System

908 — Interface Unit

Processor

904 — Input Unit
9041 — Graphics Processing Unit
9042 — Microphone

905 — Sensor

907 — User Input Unit
  Touch Panel — 9091
  Other Input Devices — 9072

906 — Display Unit
  Display Panel — 9061

Readable Medium

POWER SUPPLY SYSTEM FOR ADD-IN CARD

CROSS-REFERENCE TO RELATED APPLICATION

The present disclosure claims the priority of Chinese patent application filed on Dec. 27, 2023 before the CNIPA, China National Intellectual Property Administration with the application number of 202311824906.0, and the title of "POWER SUPPLY SYSTEM FOR ADD-IN CARD", which is incorporated herein in its entirety by reference.

FIELD

The present disclosure relates to the field of power supply technologies for add-in cards, and more particularly to a power supply system for an add-in card, a power supply method for an add-in card, a power supply apparatus for an add-in card, a server, an electronic device and a non-transitory readable storage medium.

BACKGROUND

Peripheral component interconnect express (PCIe) is a high bandwidth serial point-to-point computer expansion bus, which is widely used in the input/output (I/O) expansion field of computers. Due to the point-to-point differential serial mode, PCIe bus can provide higher transmission rate and bandwidth than parallel bus.

PCIe add-in cards are add-in cards based on a PCIe protocol. Most devices in computer peripherals that need high-speed data transmission use the interface form of PCIe add-in card devices, for example, graphics cards, network cards, data acquisition cards and field-programmable gate array (FPGA) accelerator cards. With the improvement of the processing capacity of PCIe devices such as graphic processing unit (GPU) cards and FPGA cards, the power consumption of board cards is also increasing, and some even exceed the maximum power supply capacity (300 W) of traditional PCIe. How to efficiently and reliably supply power to high power devices in the form of PCIe add-in cards has become a technical problem that a person skilled in the art needs to overcome.

SUMMARY

Some embodiments of the present disclosure provide a power supply system, method and apparatus for an add-in card, an electronic device and a non-transitory readable storage medium to overcome or at least partially solve the above problems.

Some embodiments of the present disclosure disclose a power supply system for an add-in card, where the power supply system includes a motherboard device mounted on a host device, a baseboard management controller configured on the motherboard device, and a microcontroller unit configured on the add-in card, where the add-in card is configured on the host device, and the baseboard management controller is connected to the microcontroller unit via a system management bus:

the power supply system is configured to control the microcontroller unit to send working voltage parameters for the add-in card to the baseboard management controller when the host device carrying the motherboard device is not turned on; and the baseboard management controller is configured to receive the working voltage parameters and select a power supply type for the add-in card, and control the motherboard device to supply power to the add-in card based on the power supply type when the host device is turned on.

In some embodiments, the motherboard device is provided with one or more peripheral component interconnect express slots for the add-in card, the motherboard device is provided with a power supply unit power supply circuit, and the add-in card is provided with an add-in card voltage conversion circuit:

each of the one or more peripheral component interconnect express slots is configured to connect the power supply unit power supply circuit and the add-in card voltage conversion circuit to form a first circuit when the add-in card is plugged into the motherboard device through the peripheral component interconnect express slot, and the add-in card voltage conversion circuit is provided with a first step-down module; and the motherboard device is configured to provide a working voltage for a working unit of the add-in card through the first circuit.

In some embodiments, the power supply unit power supply circuit includes a second circuit, where the baseboard management controller is configured to control the second circuit to be closed when the power supply type is a first target voltage; and the motherboard device is configured to output the first target voltage to the add-in card through the second circuit based on the one or more peripheral component interconnect express slots when the second circuit is closed.

In some embodiments, the add-in card is configured with an auxiliary power supply connector, where the auxiliary power supply connector is configured to be connected to the second circuit when the second circuit is closed; and the motherboard device is configured to output the first target voltage to the auxiliary power supply connector through the second circuit.

In some embodiments, the power supply unit power supply circuit includes a third circuit, where the baseboard management controller is configured to control the third circuit to be closed when the power supply type is a second target voltage; and the motherboard device is configured to output the second target voltage to the add-in card through the third circuit based on the one or more peripheral component interconnect express slots when the third circuit is closed.

In some embodiments, the auxiliary power supply connector is configured to be connected to the third circuit when the third circuit is closed; and the motherboard device is configured to output the second target voltage to the auxiliary power supply connector through the third circuit.

In some embodiments, the motherboard device is configured with a single-pole double-throw relay, and the single-pole double-throw relay is configured to control the second circuit or the third circuit to be closed.

In some embodiments, the second circuit and the third circuit are supplied with a voltage by a same power supply unit, the single-pole double-throw relay is connected to the power supply unit, and the second circuit is provided with a second step-down module.

In some embodiments, the baseboard management controller is connected to the single-pole double-throw relay through a single-tube transistor amplification circuit:

the baseboard management controller is configured to send a first control signal to the single-pole double-throw relay through the single-tube transistor amplification circuit; and the single-pole double-throw relay is configured to control the second circuit to be closed in response to the first control signal.

In some embodiments, the baseboard management controller is configured to send a second control signal to the single-pole double-throw relay through the single-tube transistor amplification circuit; and the single-pole double-throw relay is configured to control the third circuit to be closed in response to the second control signal.

In some embodiments, the baseboard management controller is configured to generate a power supply attribute query command, and send the power supply attribute query command to the microcontroller unit:

the microcontroller unit is configured to generate response information for expressing that the add-in card conforms to the high voltage power supply attribute in response to the power supply attribute query command; and the baseboard management controller is configured to send the second control signal to the single-pole double-throw relay through the single-tube transistor amplification circuit when receiving the response information.

In some embodiments, the baseboard management controller is configured to send the first control signal to the single-pole double-throw relay through the single-tube transistor amplification circuit when the response information is not received.

In some embodiments, the microcontroller unit is configured to perform initialization operation after sending the working voltage parameters for the add-in card to the baseboard management controller.

In some embodiments, the power supply unit power supply circuit includes a fourth circuit for the baseboard management controller and the microcontroller unit, where the first circuit, the second circuit, the third circuit and the fourth circuit are supplied with the voltage by the same power supply unit; and third step-down modules are arranged between the baseboard management controller and the power supply unit and between the one or more peripheral component interconnect express slots with the power supply unit on the fourth circuit, and the power supply unit provides a standby voltage to the baseboard management controller and the microcontroller unit through the fourth circuit.

In some embodiments, the baseboard management controller is configured to generate other power supply attribute query commands for other add-in cards after sending feedback information for the response information to the microcontroller unit, and send the other power supply attribute query commands to the other add-in cards.

In some embodiments, the motherboard device is a motherboard device conforming to open computing standards.

Some embodiments of the present disclosure further disclose a power supply method for an add-in card, where the add-in card is configured on a host device carrying a motherboard device, the add-in card is configured with a microcontroller unit, and the motherboard device is configured with a baseboard management controller, and the baseboard management controller is connected to the microcontroller unit via a system management bus, including:

sending, by the microcontroller unit, working voltage parameters for the add-in card to the baseboard management controller when the host device carrying the motherboard device is not turned on;

selecting, by the baseboard management controller, a power supply type for the add-in card in response to receiving the working voltage parameters; and controlling, by the baseboard management controller, the motherboard device to supply power to the add-in card based on the power supply type when the host device is turned on.

Some embodiments of the present disclosure further disclose a power supply apparatus for an add-in card, where the add-in card is configured on a host device carrying a motherboard device, the add-in card is configured with a microcontroller unit, and the motherboard device is configured with a baseboard management controller, and the baseboard management controller is connected to the microcontroller unit via a system management bus, including:

working voltage parameter sending module configured to send, by the microcontroller unit, working voltage parameters for the add-in card to the baseboard management controller when the host device carrying the motherboard device is not turned on;

a power supply type selection module configured to select, by the baseboard management controller, a power supply type for the add-in card in response to receiving the working voltage parameters; and an add-in card power supply module configured to control, by the baseboard management controller, the motherboard device to supply power to the add-in card based on the power supply type when the host device is turned on.

Some embodiments of the present disclosure further disclose a server, where the server is configured with a motherboard device, the motherboard device is configured with a baseboard management controller, the motherboard device has an add-in card, the add-in card is configured with a microcontroller unit, the baseboard management controller is connected to the microcontroller unit via a system management bus, the microcontroller unit is configured to send working voltage parameters for the add-in card to the baseboard management controller when the server is not turned on: the baseboard management controller is configured to receive the working voltage parameters and select a power supply type for the add-in card; and the baseboard management controller is further configured to control the motherboard device to supply power to the add-in card based on the power supply type when the server is turned on.

Some embodiments of the present disclosure further disclose an electronic device, including: a processor, a communication interface, a memory and a communication bus, where the processor, the communication interface and the memory communicate with each other through the communication bus:

the memory is configured to store computer programs; and the processor is configured to implement the method according to some embodiments of the present disclosure when executing the computer programs stored on the memory.

Some embodiments of the present disclosure further disclose a non-transitory readable storage medium storing instructions, where the instructions, when executed by one or more processors, cause the processors to perform the method according to some embodiments of the present disclosure.

Some embodiments of the present disclosure include following advantages.

In some embodiments of the present disclosure, the working voltage parameters for the add-in card are sent to the baseboard management controller through the microcontroller unit when the host device carrying the motherboard device is not turned on: the baseboard management controller selects the power supply type for the add-in card in response to receiving the working voltage parameters; and the motherboard device is controlled by the baseboard management controller to supply power to the add-in card based on the power supply type when the host device is turned on, corresponding power supply types are set for add-in cards with different working voltage parameters, thereby improving the power supply efficiency for add-in cards.

BRIEF DESCRIPTION OF THE DRAWINGS

FIG. 6 is a schematic flowchart of a software initialization of a microcontroller unit provided in some embodiments of the present disclosure.

FIG. 7 is a flowchart of steps of a power supply method for an add-in card provided in some embodiments of the present disclosure.

FIG. 8 is a block diagram of a structure of a power supply apparatus for an add-in card provided in some embodiments of the present disclosure.

FIG. 9 is a block diagram of a hardware structure of an electronic device provided in some embodiments of the present disclosure.

DETAILED DESCRIPTION

Figure 1:
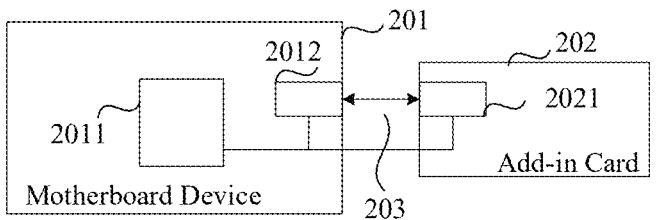
FIG. 1 is a schematic structural diagram of a power supply system for an add-in card provided in some embodiments of the present disclosure.

In order to make the objectives, features, and advantages of the present disclosure more obvious and easy to understand, the present disclosure will be described in further detail below with reference to the accompanying drawings and specific embodiments.

In practical applications, a connecting finger is a component that transmits signals on computer hardware (for example, between a memory and a memory slot, a display card and a display card slot, and the like). It is composed of many golden conductive contacts, and it is called "gold finger" because of a gold-plated surface thereof and an arrangement of the conductive contacts like a finger.

In PCIe specifications, there are generally two methods for power supply of PCIe add-in cards, namely connecting finger power supply and auxiliary power supply. The connecting finger of a board card can provide a maximum power supply capacity of 75 W. When the power consumption of the board card is greater than 75 W (Watt), additional auxiliary power supply is needed. The auxiliary power supply cable is connected to the board card through 2×3 or 2×4 connectors on the board card to provide additional power supply.

Although various standards of auxiliary power supply at an add-in card side are defined in the PCIe specifications, specifications and parameters at a motherboard side are not strictly defined, and thus in practical applications, when PCIe add-in card devices are plugged into different motherboards, using external auxiliary power supply will cause many inconveniences, for example, inconsistent connector models and inconsistent pin definitions, which all cause inconvenience in use. Table 1 is a definition of connecting finger power supply and auxiliary power supply in the PCIe specifications.

TABLE 1

| Open Compute Project (OCP) Power supply Rail Requirements | | | |
|---|---|---|---|
| Power Rail | 75 W Slot | 2*3 Auxiliary Connector | 2*3 Auxiliary Connector |
| +3.3 V | 3.0 A (Max) | N/A | N/A |
| +12 V | 5.5 A (Max) | 6.25 A (Max) | 12.5 A (Max) |
| +3.3 V AUX | 375 mA (Max) | N/A | N/A |

In addition, when the power consumption of the PCIe add-in cards exceeds 300 W, the traditional mode of "connecting finger power supply and auxiliary power supply" will not be able to meet the requirements.

In order to solve the power supply problem of PCIe devices with power consumption greater than 300 W, two auxiliary power supply connectors can be introduced into a new PCIe protocol. One is a 12V (Volt) power supply connector 12VHPWR (Hardware Power), which can provide a maximum current of 5.5 A (Ampere); and the other is a 48V connector 48VHPWR, which can provide a maximum current of 15 A. The two newly added connectors are different from the existing auxiliary connectors in appearance and pin number, that is, the new connectors need to be used with new server motherboards and cables. This means that in future server motherboard designs, in order to support PCIe add-in card devices with new and old power supply solutions, it is necessary to keep a variety of connectors with different voltages and shapes at the same time, which will need more motherboard space, more kinds of materials and more complex power supply topologies for server designs.

The present disclosure proposes a power supply method for an add-in card, which is a power supply solution for a novel PCIe add-in card device. Through hardware circuits on the server motherboard and the PCIe add-in card and a communication protocol between both parties, the server motherboard will provide a higher voltage (for example, 48V) on the connecting finger and the auxiliary power supply connector, thereby increasing the power supply and reducing the use of auxiliary power supply cables. After using high voltage power supply, devices that previously needed auxiliary power supply may be normally powered only through the connecting finger, thereby effectively reducing the setting of auxiliary power supply interface, and greatly reducing the power loss and calorific value in the transmission path.

In order to make a person skilled in the art better understand some embodiments of the present disclosure, some technical terms involved in some embodiments of the present disclosure are explained below.

Motherboard, also known as a mother board, is mounted within a computer mainframe case. The motherboard is one of the most basic and important parts of the computer, and plays a vital role in the whole computer system. The quality of motherboard manufacturing determines the stability of a hardware system. The motherboard is closely related to a central processing unit (CPU), and every major upgrade of the CPU will inevitably lead to a replacement of the motherboard. The motherboard is the core of a computer hardware system and also the largest printed circuit board in the mainframe case. The main function of the motherboard is to transmit various electronic signals, and some processors are also responsible for preliminarily processing some peripheral data. Various components in the computer host are connected through the motherboard, and the computer must control the system memory, storage devices and other input/output (I/O) devices through the motherboard during normal operation.

Central processing unit (CPU), as an operation and control core of the computer system, is a final execution unit for information processing and program operation. Since creation of the CPU, it has made great developments in logical structure, operating efficiency, and functional extension.

Graphics processing unit (GPU), also referred to as a display core or a visual processor, is a microprocessor that specializes in image and graphics-related operations on a personal computer, a workstation, a game console, and some mobile devices (for example, tablet computers, smartphones, and the like).

ASIC is an application specific integrated circuit technology for specialized applications, which is considered as an integrated circuit designed for special purposes in the field of integrated circuits. With the rapid development of ASIC technologies, the forwarding performance between ASICs can usually reach 1 Gbs or even higher, which provides an excellent material basis for switching matrix.

Field programmable gate array (FPGA) is a product of further development on the basis of programmable devices such as programmable array logic (PAL) and generic array logic (GAL), and may be used as a semi-custom circuit in the field of application specific integrated circuits (ASICs), which not only solves the deficiency of the custom circuits but also overcomes the shortcomings of the limited number of gate circuits of the original programmable device.

Peripheral component interconnect express (PCIe) is a high-speed serial computer expansion bus standard. Its original name is "third generation input/output (3GIO)", which aims to replace the old peripheral component interconnect (PCI), peripheral component interconnect extended (PCI-X) and accelerated graphics port (AGP) bus standards.

BMC is called baseboard management controller, which is a core component of a server management system defined by an intelligent platform management interface (IPMI) protocol, and is a hardware manager integrated in servers, network devices and other computer systems. The function of the BMC is to monitor a hardware state of devices, perform remote management operations and provide monitoring and control functions for devices. The BMC uses sensors to monitor a state of a computer, a network server, or other hardware driven devices, and communicates with system administrators through independent connection lines. The BMC is a part of intelligent platform management interface (IPMI) and is usually included in the motherboard or a main circuit board of a monitored device.

The sensors of the BMC are used to measure internal physical variables, for example, temperature, humidity, power supply voltage, fan speed, communication parameters and operating system (OS) functions. If any of these variables is out of specified limits, it will notify administrators. The administrators will use remote control to take correct measures. Monitoring devices can be powered on or restarted when necessary. In this way, a single administrator may remotely control countless servers and other devices at the same time, thereby saving the overall cost of the network and ensuring the reliability.

Microcontroller unit (MCU) is also known as a single chip microcomputer or a single chip machine, which appropriately reduces frequency and specifications of a central process unit (CPU) and integrates a memory, a timer, a universal serial bus (USB), analog to digital (A/D) conversion, a universal asynchronous receiver/transmitter (UART), a programmable logic controller (PLC), a direct memory access (DMA) and peripheral interfaces, and even an liquid crystal display (LCD) drive circuit on a single chip to form a chip-level computer. Different combinations of control may be made for different applications, for example, control of mobile phones, personal computer (PC) peripherals, remote controllers, automobile electronics, industrial stepping motors, robotic arms, and the like.

System management bus (SMBus) provides a control bus for tasks such as system and power management. In systems using the SMBus, messages are sent and received between devices through the SMBUS instead of using a separate control line, thereby saving the number of pins of devices. Using the SMBus, the devices may also provide their production information, tell the system their models, part numbers, and the like, save their states for suspension events, report different types of errors, receive control parameters and return their states.

Referring to FIG. 1. FIG. 1 is a schematic structural diagram of a power supply system for an add-in card provided in some embodiments of the present disclosure.

In a specific implementation, the power supply system of some embodiments of the present disclosure can be configured on a host device carrying a motherboard device, for example, a server, a personal computer PC, and the like.

In a specific implementation, the power supply system of some embodiments of the present disclosure can include a motherboard device 201 mounted on a host device, a baseboard management controller 2012 configured on the motherboard device 201, and a microcontroller unit 2021 configured on an add-in card 202.

The add-in card 202 can be connected to the motherboard device 201, for example, through a peripheral component interconnect express slot inserted on the motherboard device with a connecting finger.

The baseboard management controller 2012 and the microcontroller unit 2021 of some embodiments of the present disclosure can be connected via the system management bus 203.

For example, the motherboard device 201 of some embodiments of the present disclosure can provide standby power of 3.3 volts to the baseboard management controller 2012 and the microcontroller unit 2021 through the power supply unit 2011 when the host device is not turned on, and thus the power supply system can control the microcontroller unit 2021 to send working voltage parameters for the add-in card (PCIe add-in card) 202 to the baseboard management controller when the host device is not turned on. For example, a rated voltage of the current add-in card (PCIe add-in card) 202 is 36V to 64V, and thus the microcontroller unit 2021 can generate working voltage parameter information for expressing the rated voltage of 36V to 64V. The working voltage parameter information can occupy two bytes, which respectively represent the lowest voltage and the highest voltage that the device can work normally. In practical applications, the two bytes of working voltage parameter information can cover a direct current (DC) voltage range of 0V to 255V.

Of course, the above examples are only illustrations, and a person skilled in the art can send the working voltage parameters for the add-in card to the baseboard management controller through the microcontroller unit in any other ways, which is not limited by some embodiments of the present disclosure.

In addition, a person skilled in the art can also provide the standby power to the baseboard management controller 2012 and the microcontroller unit 2021 in other ways. For example, the standby power can be provided by configuring rechargeable batteries for the baseboard management controller 2012 and the microcontroller unit 2021, which is not limited by some embodiments of the present disclosure.

After sending the working voltage parameters for the add-in card (PCIe add-in card) to the baseboard management controller 2012 through the microcontroller unit 2021, the baseboard management controller can be used to select a power supply type for the add-in card in response to receiving the working voltage parameters. For example, after receiving the working voltage parameter information for expressing the rated voltage of 36V to 64V sent by the microcontroller unit 2021, the baseboard management controller 2012 can select the power supply type for the add-in card as high voltage power supply.

In a specific implementation, the baseboard management controller of some embodiments of the present disclosure can control the motherboard device to supply power to the add-in card based on the power supply type when the host device is turned on. For example, after the microcontroller unit 2021 sends the working voltage parameters for the add-in card (PCIe add-in card) to the baseboard management controller 2012, the baseboard management controller can select the power supply type for the add-in card in response to receiving the working voltage parameters. The power supply unit 2011 can provide a high voltage of 48V, and the baseboard management controller 2012 can select the power supply type for the add-in card as high voltage power supply after receiving the working voltage parameter information for expressing the rated voltage of 36V to 64V sent by the microcontroller unit 2021. At this time, the baseboard management controller can control the power supply unit 2011 on the motherboard device to directly provide the voltage of 48V to the peripheral component interconnect express slot for the add-in card (PCIe add-in card) without step-down, so as to supply power to the add-in card (PCIe add-in card) through the connecting finger inserted in the peripheral component interconnect express slot.

Of course, the above examples are only illustrations, and a person skilled in the art can set power supply types for different working voltage parameters according to actual needs, which is not limited by some embodiments of the present disclosure.

In some embodiments of the present disclosure, the working voltage parameters for the add-in card are sent to the baseboard management controller through the microcontroller unit when the host device carrying the motherboard device is not turned on; the baseboard management controller selects the power supply type for the add-in card in response to receiving the working voltage parameters; and the motherboard device is controlled by the baseboard management controller to supply power to the add-in card based on the power supply type when the host device is turned on, corresponding power supply types are set for add-in cards with different working voltage parameters, thereby improving the power supply efficiency for add-in cards.

Based on the above embodiments, some variant embodiments of the above embodiments are proposed. It should be noted here that in order to make the description brief, only the differences from the above embodiments are described in some variant embodiments.

In some embodiments of the present disclosure, the motherboard device is provided with one or more peripheral component interconnect express slots for the add-in card, the motherboard device is provided with a power supply unit power supply circuit, and the add-in card is provided with an add-in card voltage conversion circuit:

each of the one or more peripheral component interconnect express slots is configured to connect the power supply unit power supply circuit and the add-in card voltage conversion circuit to form a first circuit when the add-in card is plugged into the motherboard device through the peripheral component interconnect express slot, and the add-in card voltage conversion circuit is provided with a first step-down module; and the motherboard device is configured to provide a working voltage for a working unit of the add-in card through the first circuit.

In practical applications, a power supply (personal computer (PC) power supply unit, abbreviated as PSU or power supply unit) supplies power to all components of a computer. The power supply in a PC is an electrical power converting type of power (which is different from a batter powered type of power). The power supply in the PC converts a standard alternating current (AC) into a direct current (DC), which has a low voltage and is more stable, for other components in the computer. General PC power supplies are switching power supplies, and input voltage automatically adapts to mains electricity parameters at a user's location (and some products may need the user to adjust the voltage changeover switch).

The motherboard device of some embodiments of the present disclosure can be provided with one or more peripheral component interconnect express slots for the add-in card. The add-in card can be inserted into the peripheral component interconnect express slot on the motherboard device through a connecting finger, and the motherboard device is provided with a power supply unit power supply circuit.

In practical applications, peripheral circuits are not laid on the motherboard, but are connected to the motherboard. The peripheral circuits need to occupy the space of the host device and affect the heat dissipation of the fan of the add-in card. The power supply unit power supply circuit is different from the peripheral circuits and can be laid on the surface of the motherboard. Similarly, the voltage conversion circuit of the add-in card can also be laid on the add-in card.

Figure 2:
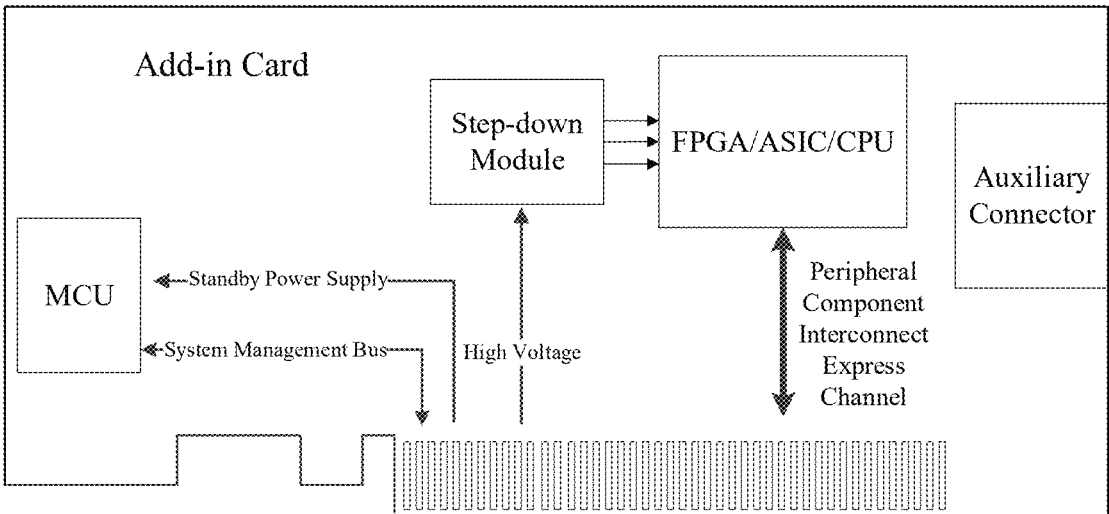
FIG. 2 is a schematic structural diagram of an add-in card provided in some embodiments of the present disclosure.

Referring to FIG. 2, FIG. 2 is a schematic structural diagram of an add-in card provided in some embodiments of the present disclosure. The add-in card is provided with an add-in card voltage conversion circuit.

In practical applications, the add-in card is generally configured with working units, for example, field programmable gate arrays (FPGAs), application specific integrated circuits (ASICs) or central processing units (CPUs) configured on the add-in card. Compared with an output voltage (12V or 48V) of the power supply unit, the working voltage of the power supply unit is a low voltage (3.3V), and the peripheral component interconnect express slot can provide a voltage of 12V or 48V to the peripheral component interconnect express slot for the add-in card through the power supply.

In practical applications, a DC/DC converter is a switching power supply processor that performs switching in high frequency through controllable switches (metal oxide semiconductor field effect transistors. MOSFETs) utilizing characteristics of energy storage of the capacitors or inductors and stores the input electrical energy in a capacitor (inductance), when the switch is off, the power is released to the load and provide energy. The ability to output power or voltage of the DC/DC converter is related to the duty cycle (a ratio of on-time of the switch to the entire period of the switch). The switching power supply can be used to increase voltage and reduce voltage. The output voltage is compared with a reference voltage through a voltage divider resistor to form a feedback. When the output voltage decreases and is lower than the reference voltage, an output of the comparator flips and triggers an oscillation circuit to start working. The oscillation circuit outputs a pulse with a fixed time, which is used to control the conduction of a metal oxide semiconductor (MOS) transistor. Otherwise, the MOS transistor will be turned off. The conduction is controlled by an oscillator and an off time depends on loads. In this way, the output voltage may be controlled.

The peripheral component interconnect express slot can be used to connect the power supply unit power supply circuit and the add-in card voltage conversion circuit to form the first circuit when the add-in card is plugged into the motherboard device through the peripheral component interconnect express slot. In some embodiments of the present disclosure, the motherboard device may directly provide high voltage power to the first circuit by arranging the first step-down module DC/DC on the add-in card voltage conversion circuit. The first step-down module DC/DC may convert the high voltage power output by the power supply unit into the working voltage required by the working unit, thereby further improving the power supply efficiency of the power supply system.

In some embodiments of the present disclosure, the power supply unit power supply circuit includes a second circuit, where the baseboard management controller is configured to control the second circuit to be closed when the power supply type is a first target voltage; and the motherboard device is configured to output the first target voltage to the add-in card through the second circuit based on the one or more peripheral component interconnect express slots when the second circuit is closed.

Figure 3:
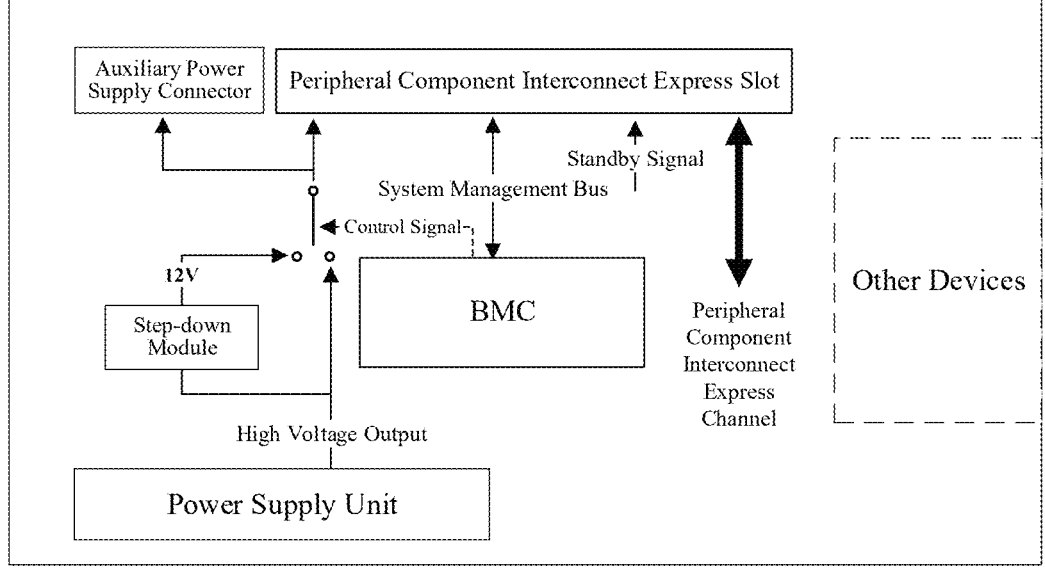
FIG. 3 is a schematic structural diagram of a second circuit and a third circuit provided in some embodiments of the present disclosure.

Referring to FIG. 3, FIG. 3 is a schematic structural diagram of a second circuit and a third circuit provided in some embodiments of the present disclosure.

For example, the power supply unit power supply circuit can include a second circuit, and a first target voltage can be 12V. The second circuit is provided with a DC/DC step-down module, which can convert a voltage of 48V into a voltage of 12V. The DC/DC step-down module can be arranged on the add-in card (PCIe add-in card), or can be independently arranged at other positions before the add-in card (PCIe add-in card) in the second circuit.

The power supply unit can provide a high voltage of 48V, and the baseboard management controller 2012 can select the power supply type for the add-in card as low voltage power supply after receiving the working voltage parameter information for expressing the rated voltage of 10V to 14V sent by the microcontroller unit 2021. At this time, the baseboard management controller can control the second circuit to be closed. Although the power supply unit 2011 on the motherboard device provides the voltage of 48V to the peripheral component interconnect express slot for the add-in card (PCIe add-in card), after being stepped down by the DC/DC step-down module, the voltage supplied to the add-in card (PCIe add-in card) is 12V.

Of course, the above examples are only illustrations, and a person skilled in the art can provide the first target voltage to the second circuit in other ways, for example, by setting a plurality of power supply modules. The power supply module with an output voltage of 12V can independently provide the first target voltage for the second circuit, which is not limited by some embodiments of the present disclosure.

In some embodiments of the present disclosure, the second circuit is controlled to be closed by the baseboard management controller, and the motherboard device is used to output the first target voltage to the add-in card through the second circuit based on the peripheral component interconnect express slot when the second circuit is closed, thereby realizing independent power supply for the add-in card to output a relatively low voltage, and further improving the power supply efficiency for the add-in card.

In some embodiments of the present disclosure, the add-in card is configured with an auxiliary power supply connector, where the auxiliary power supply connector is configured to be connected to the second circuit when the second circuit is closed; and the motherboard device is configured to output the first target voltage to the auxiliary power supply connector through the second circuit.

In a specific implementation, in order to further improve the power supply efficiency for the add-in card, an auxiliary power supply connector corresponding to the add-in card may be provided in the second circuit. When the second circuit is closed, the auxiliary power supply connector is connected to the second circuit, and the first target voltage is output to the auxiliary power supply connector through the second circuit, so that the first target voltage may be provided to the add-in card through the auxiliary power supply connector.

In some embodiments of the present disclosure, the power supply unit power supply circuit includes a third circuit, where the baseboard management controller is configured to control the third circuit to be closed when the power supply type is a second target voltage; and the motherboard device is configured to output the second target voltage to the add-in card through the third circuit based on the one or more peripheral component interconnect express slots when the third circuit is closed.

In some embodiments, in order to further improve the power supply efficiency for add-in cards, the auxiliary power supply connector is configured to be connected to the third circuit when the third circuit is closed; and the motherboard device is configured to output the second target voltage to the auxiliary power supply connector through the third circuit.

Referring to FIG. 3, FIG. 3 is a schematic structural diagram of a second circuit and a third circuit provided in some embodiments of the present disclosure.

For example, the second target voltage can be a voltage of 48V, the peripheral component interconnect express slot can provide the voltage of 48V to the peripheral component interconnect express slot for the add-in card through the power supply, and there is no DC/DC step-down module provided in the third circuit.

The power supply unit can provide a high voltage of 48V, if the baseboard management controller 2012 receives the working voltage parameter information for expressing the rated voltage of 10V to 14V sent by the microcontroller unit 2021, the baseboard management controller 2012 can select the power supply type for the add-in card as low voltage power supply, and the baseboard management controller can control the second circuit to be closed at this time. Although the power supply unit 2011 on the motherboard device provides the voltage of 48V to the peripheral component interconnect express slot for the add-in card (PCIe add-in card), after being stepped down by the DC/DC step-down module, the voltage supplied to the add-in card (PCIe add-in card) is 12V. If the baseboard management controller 2012 receives the working voltage parameter information for expressing the rated voltage of 36V to 64V sent by the microcontroller unit 2021, the baseboard management controller 2012 can select the power supply type for the add-in card as low voltage power supply, the baseboard management controller can control the third circuit to be closed at this time, and the power supply unit 2011 on the motherboard device directly provides the voltage of 48V to the peripheral component interconnect express slot for the add-in card (PCIe add-in card).

In some embodiments of the present disclosure, the second circuit or the third circuit is controlled to be closed by the baseboard management controller, the motherboard device is used to output the first target voltage or the second target voltage to the add-in card based on the peripheral component interconnect express slot through the second circuit or the third circuit, so as to realize fast switching of different voltage circuits for different types of add-in cards, thereby further improving the power supply efficiency for the add-in card.

In some embodiments of the present disclosure, the motherboard device is configured with a single-pole double-throw relay, and the single-pole double-throw relay is configured to control the second circuit or the third circuit to be closed.

Single-pole double-throw relay, also known as a 3 pole double throw (3PDT) relay, is a commonly used type of relay including three contacts, where each of the three contacts can switch between two circuits. "Single-pole" means that there is a contact that can switch circuits, and "double-throw" means that each contact can switch between two circuits. The single-pole double-throw relay may realize functions such as positive and negative rotation, multi-channel selection, and the like in the circuit.

In some embodiments of the present disclosure, the second circuit and the third circuit are supplied with a voltage by a same power supply unit, the single-pole double-throw relay is connected to the power supply unit, and the second circuit is provided with a second step-down module.

Referring to FIG. 3, FIG. 3 is a schematic structural diagram of a second circuit and a third circuit provided in some embodiments of the present disclosure. In order to further improve the power supply efficiency of the power supply system and simplify the power supply circuit design in the host device, some embodiments of the present disclosure can use the same power supply unit to supply power to the second circuit and the third circuit, the single-pole double-throw relay can be connected to the power supply unit, and the second circuit can be provided with the second step-down module. For example, the power supply unit can only provide a voltage of 48V, when the single-pole double-throw relay closes the second circuit, the voltage of 48V can be converted into a voltage of 12V through the second step-down module to provide the voltage of 12V to the PCIe slot.

In some embodiments of the present disclosure, the baseboard management controller is connected to the single-pole double-throw relay through a single-tube transistor amplification circuit:

the baseboard management controller is configured to send a first control signal to the single-pole double-throw relay through the single-tube transistor amplification circuit;

the single-pole double-throw relay is configured to control the second circuit to be closed in response to the first control signal;

the baseboard management controller is configured to send a second control signal to the single-pole double-throw relay through the single-tube transistor amplification circuit; and the single-pole double-throw relay is configured to control the third circuit to be closed in response to the second control signal.

The operation of the single-pole double-throw relay is based on the principle of electromagnetic induction. When a current is introduced into a circuit, an electromagnet of the relay generates a magnetic field to attract or release contacts to switch the circuit. In the single-pole double-throw relay, one contact is connected to a common terminal of the relay, and the other two contacts are connected to two different contacts respectively. When the electromagnet is not energized, the common terminal is connected to one contact, while the other contact is not connected; and when the electromagnet is energized, a force of a magnetic field makes the common terminal to be connected to another contact, while the previous contact is not connected, thereby realizing the switching of a contact between two circuits.

For example, a switching circuit responsible for switching the voltage on the motherboard is realized by a single-pole double-throw relay. A normally closed node of the single-pole double-throw relay can be connected to a 12V main power rail of the second circuit, that is, the relay is connected to the 12V main power rail by default after being powered on, thereby ensuring that the PCIe slot will obtain 12V power supply by default after being turned on. It supports traditional PCIe cards by default, and a normally open node of the single-pole double-throw relay is connected to a 48V main power rail. A coil of the relay can be controlled by a first control signal or a second control signal sent by the baseboard management controller BMC through the single-tube transistor amplification circuit.

In some embodiments of the present disclosure, by connecting the single-tube transistor amplification circuit with the single-pole double-throw relay, the switching between the second circuit and the third circuit is efficiently realized, and the power supply efficiency for the add-in card is further improved.

In some embodiments of the present disclosure, the power supply unit power supply circuit includes a fourth circuit for the baseboard management controller and the microcontroller unit, where the first circuit, the second circuit, the third circuit and the
fourth circuit are supplied with the voltage by the same
power supply unit; and third step-down modules are
arranged between the baseboard management control-
ler
and the power supply unit and between the one or more
peripheral component interconnect express slots with
the power supply unit on the fourth circuit, and the
power supply unit provides a standby voltage to the
baseboard management controller and the microcon-
troller unit through the fourth circuit.

Figure 4:
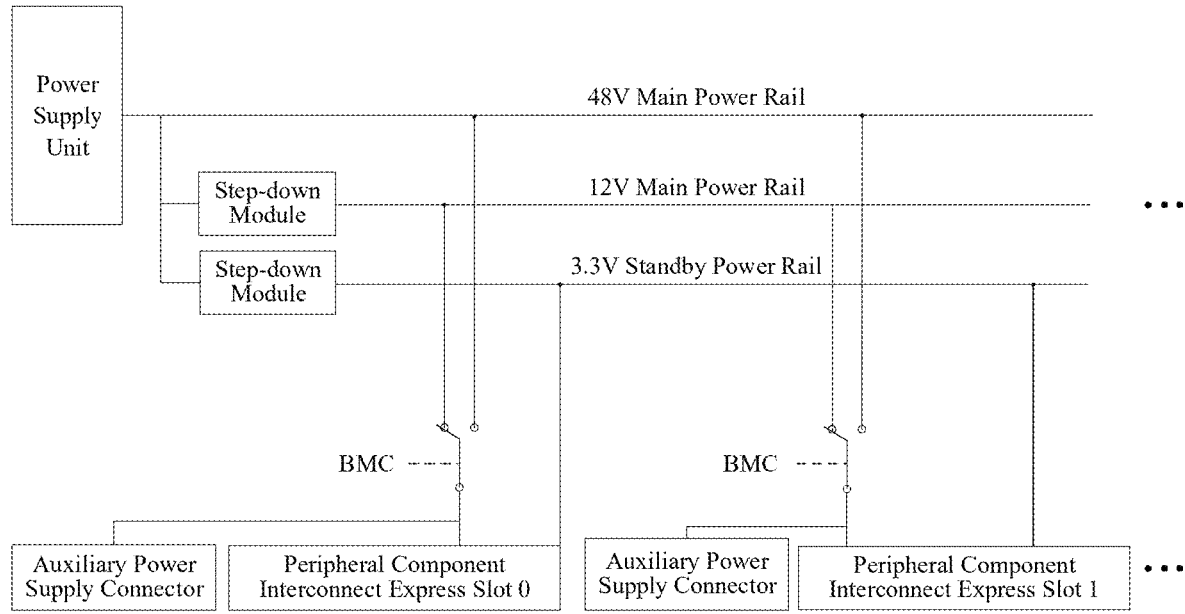
FIG. 4 is a schematic structural diagram of a multi-rail power supply provided in some embodiments of the present disclosure.

Referring to FIG. 4, FIG. 4 is a schematic structural diagram of a multi-rail power supply provided in some embodiments of the present disclosure.

For example, the second circuit may be a 12V circuit, the third circuit may be a 48V circuit, and the fourth circuit may be a 3.3V circuit.

The power supply unit only provides a single 48V output, and 12V is converted from 48V by a high power DC-DC power module (Q54SH12084, 1000 W).

On the fourth circuit, third step-down modules can be arranged between the baseboard management controller and the power supply unit, and between the peripheral component interconnect express slot and the power supply unit. The 48V power supply provided by the power supply unit can be converted by the third step-down modules DC-DC to obtain a standby voltage of 3.3V, which is respectively output to the baseboard management controller BMC and each PCIe slot on the motherboard device, and is used to provide the standby power to the baseboard management controller on the motherboard device and the microcontroller unit on the PCIe device before the system is started.

In some embodiments of the present disclosure, the PCIe add-in card device is an FPGA board card with a rated power consumption of 250 W. The microcontroller unit (MCU) on the add-in card is a low power advanced RISC machine (ARM) core processor of STM32 (microelectronics, 32-bit microcontroller), which may work normally under the power supply of 3.3V standby power.

In some embodiments of the present disclosure, the baseboard management controller is configured to generate a power supply attribute query command, and send the power supply attribute query command to the microcontroller unit;

the microcontroller unit is configured to generate response
information for expressing that the add-in card con-
forms to the high voltage power supply attribute in
response to the power supply attribute query command;
the baseboard management controller is configured to
send the second control signal to the single-pole
double-throw relay through the single-tube transistor
amplification circuit when receiving the response infor-
mation; and
the baseboard management controller is configured to
send the first control signal to the single-pole double-throw relay through the single-tube transistor amplifi-
cation circuit when the response information is not
received.

Figure 5:
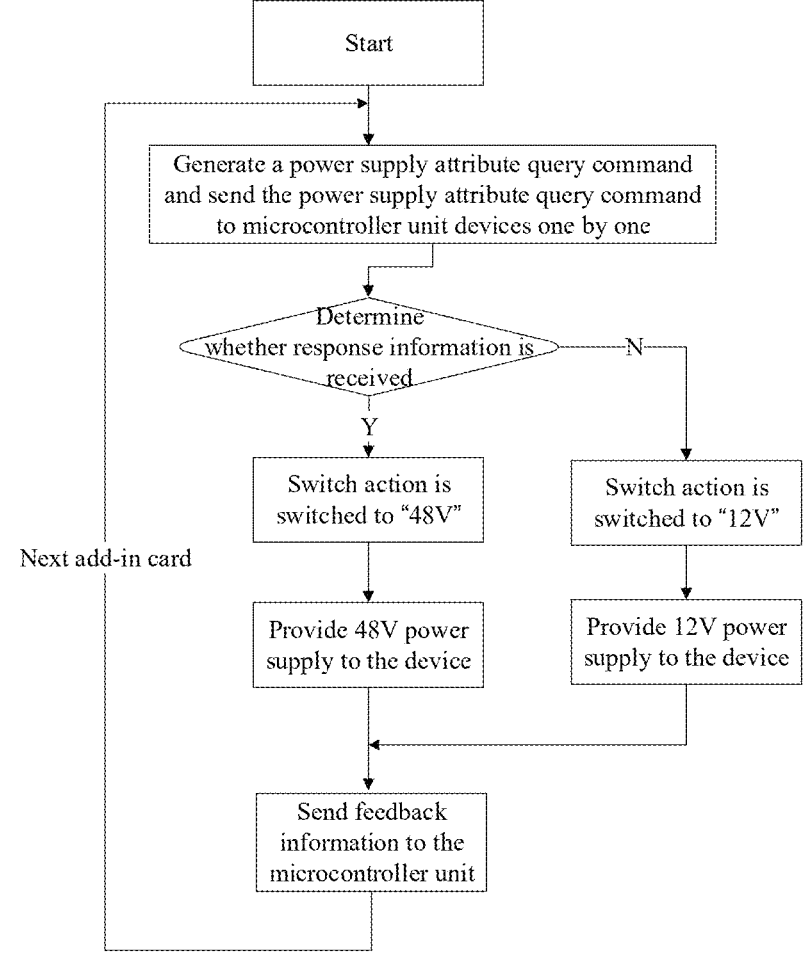
FIG. 5 is a schematic flowchart of a software initialization of a baseboard management controller provided in some embodiments of the present disclosure.

Referring to FIG. 5, FIG. 5 is a schematic flowchart of a software initialization of a baseboard management controller provided in some embodiments of the present disclosure.

For example, the baseboard management controller can be used to generate a power supply attribute query command and send the power supply attribute query command to the microcontroller unit. The microcontroller unit can generate response information for expressing that the add-in card conforms to the high voltage power supply attribute in response to the power supply attribute query command.

When it is determined that the baseboard management controller has received the response information, the baseboard management controller can send the second control signal to the single-pole double-throw relay through the single-tube transistor amplification circuit, so that the single-pole double-throw relay closes the third circuit and provides a 48V power supply to the add-in card.

When it is determined that the baseboard management controller has not received the response information, the baseboard management controller can send the first control signal to the single-pole double-throw relay through the single-tube transistor amplification circuit, so that the single-pole double-throw relay closes the second circuit and provides a 12V power supply to the add-in card.

In some embodiments of the present disclosure, the motherboard device can be configured with a plurality of add-in cards.

Referring to FIG. 5, FIG. 5 is a schematic flowchart of a software initialization of a baseboard management controller provided in some embodiments of the present disclosure.

The baseboard management controller can be further configured to generate other power supply attribute query commands for other add-in cards after sending feedback information to the microcontroller unit, and send the other power supply attribute query commands to the other add-in cards.

In some embodiments of the present disclosure, the microcontroller unit is configured to perform initialization operation after sending the working voltage parameters for the add-in card to the baseboard management controller.

The purpose of initialization is to set a system or program to a predictable and reliable state to ensure that the system or program is capable of normal operation.

Referring to FIG. 6, FIG. 6 is a schematic flowchart of a software initialization of a microcontroller unit provided in some embodiments of the present disclosure.

For example, the microcontroller unit is used to generate response information for expressing that the add-in card conforms to the high voltage power supply attribute, and the response information can be expressed in the form of double bytes. When receiving the attribute query command sent by the baseboard management controller, the response information can be sent to the baseboard management controller: the baseboard management controller is used to generate feedback information for expressing that the response information has been received, and send the feedback information to the microcontroller unit: after receiving the feedback information, the microcontroller unit can perform initialization operation on other functions in response to receiving the feedback information.

In some embodiments of the present disclosure, the motherboard is a server motherboard conforming to an open compute project (OCP). A major feature of OPC standard is the use of a 48V voltage bus, and at the same time it also provides 12V power supply for the motherboard compatible with the traditional power supply solution. That is, the motherboard includes two main power rails, namely the 48V main power rail and the 12V main power rail.

In order to make a person skilled in the art better understand some embodiments of the present disclosure, some embodiments of the present disclosure are described below with a complete example.

In practical applications, the advantages of high voltage power supply are as follows.

1. High voltage power supply may reduce losses on the transmission channels and improve the power supply efficiency of the system. The reason is that the transmission current at the same power is reduced.

2. It may provide more power on limited PCIe power supply interfaces and reduce the use of auxiliary power supply cables.

3. There is a range of high voltage, which may not exceed a safe voltage grade and creepage clearance allowed by existing connectors.

The present disclosure relates to the software and hardware design of the server motherboard and the PCIe add-in card. On the server motherboard side, it is necessary to be compatible with traditional PCIe devices and devices that support high voltage power supply. On the PCIe add-in card end, there is a microcontroller (MCU), which is connected to the BMC on the motherboard through SMBUS pins of a connecting finger. Both the BMC and the MCU are powered by a standby power (Standby) of a server system, so that the BMC and the MCU may start working under the standby power before the server is started. The two parties communicate through a predetermined protocol and transmit some key parameters, including working voltage parameters of PCIe add-in card devices. The BMC decides what voltage to provide to the PCIe slot according to the voltage parameters, namely providing a high voltage to cards that support the high voltage, otherwise providing the traditional 12V voltage.

Referring to FIG. 2, the PCIe add-in card device can support the high voltage and can work at an input voltage higher than the traditional 12V. Compared with the traditional 12V power supply mode, the PCIe add-in card needs to select higher withstand voltage devices in DC-DC power converters, or use a two-stage voltage conversion method, that is, high voltage→12V→the working voltage of each processor, so as to achieve the purpose of supporting higher power supply voltages.

In addition to supporting the high voltage, the PCIe add-in card device in some embodiments of the present disclosure is provided with a microprocessor (MCU) with a SMBus communication interface for communicating with the BMC on the motherboard. The communication protocol includes that the PCIe add-in card reports its supported voltage parameter to the BMC. This parameter occupies two bytes, which respectively represent the lowest voltage and the highest voltage that the device can work normally, and a range of the DC voltage that can be covered is 0V to 255V. When the BMC on the motherboard knows the voltage range of the device through this parameter, the BMC can determine whether the high voltage can be provided to the device. For example, the BMC on the server knows that a normal working voltage range of the device is 36V to 64V, and the BMC can safely provide 48V power supply to the device.

Referring to FIG. 3, a server motherboard is provided with a switching circuit for voltage switching, which is controlled by a baseboard management controller (BMC) on the motherboard. When obtaining the attribute that a PCIe device supports high voltage power supply, the BMC will set the switch in a specific state, so that the high voltage will be output to the PCIe slot and the corresponding auxiliary power supply connector through the switch. When the PCIe device does not support high voltage power supply but uses the traditional 12V power supply, the switch will be set in another state to output the voltage of 12V to the PCIe slot and the corresponding auxiliary power supply connector.

The motherboard device may be a server motherboard conforming to an open compute project (OCP). A major feature of OPC standard is the use of a 48V voltage bus, and at the same time it also provides 12V power supply for the motherboard compatible with the traditional power supply solution. Referring to FIG. 4, the motherboard includes two main power rails, namely the 48V main power rail and the 12V main power rail. The PSU only provides a single 48V output, and 12V is converted from 48V by a high power DC-DC power module (Q54SH12084, 1000 W). In addition, there is a standby power of 3.3V converted from 48V through DC to DC, which is respectively output to the BMC and each PCIe slot on the motherboard, so as to provide the standby power to the controllers (MCUs) on the BMC and the PCIe device in the motherboard before the system is started. The PCIe add-in card device is an FPGA board card with a rated power consumption of 250 W. The MCU on the board card is a low power ARM core processor of STM32, which may work normally under the power supply of 3.3V standby power.

The switching circuit responsible for switching the voltage on the motherboard is realized by the single-pole double-throw relay. The normally closed node of the single-pole double-throw relay is connected to the 12V main power rail of the second circuit, in this way, the relay is connected to the 12V main power rail by default after being powered on, thereby ensuring that the PCIe slot will obtain 12V power supply by default after being turned on. It supports traditional PCIe cards by default. The normally open node of the relay is connected to the 48V main power rail. The coil of the relay is controlled by a switching signal sent by the BMC through the single-tube transistor amplification circuit.

In the standby state, the BMC communicates with the microcontroller MCU on the PCIe add-in card through the SMBus bus on the PCIe slot, and obtains the voltage parameters supported by the card end from the MCU according to the predetermined communication protocol. As a prior art, the implementation of communication protocols is not the technical focus of the present disclosure, and will not be described in detail here. When the BMC knows that a PCIe add-in card device with 12V power supply is inserted into the PCIe slot, the BMC controls pin to remain in the power-on state, and no relay action signal is sent out. The relay continues to be connected to the normally closed node, so that the motherboard continues to connect the PCIe slot and the auxiliary power supply connector with the 12V main power rail. When BMC knows that the PCIe add-in card device supporting 48V high voltage power supply is inserted into the PCIe slot, the BMC sends out a control signal to activate the relay. The normally open node of the relay is connected, and the motherboard connects the PCIe slot and the auxiliary power supply connector with the 48V main power rail. In this way, when the system is started, PCIe add-in card devices supporting different power supply voltages will obtain their own matching power supply voltages to avoid voltage mismatch and failure.

In contrast, when the traditional server motherboard provides 12V power supply to the FPGA card, in addition to 66 W (12V/5.5 A) power provided by the connecting finger, two auxiliary power supply cables are needed to provide the maximum power of 75 W and 150 W respectively. The additional two cables make it very inconvenient for the PCIe add-in card device to adapt to the server, as the auxiliary power supply connectors provided by different models of motherboards of the server are different, and shapes and pin definitions of the auxiliary power supply connectors are different, and thus it is necessary to customize different power supply cables for different motherboards. In addition, the existence of auxiliary power supply cables will block the air intake of the PCIe add-in card, thereby affecting the heat dissipation performance of the card.

In the case where the FPGA card proposed in the present disclosure supports 48V power supply and is matched with the new motherboard in the present disclosure, all the required electric power (48V/5.5 A) may be obtained only from the connecting finger without the need for auxiliary power supply cables. The internal structure of the server is simple, the power loss on the transmission path is significantly reduced, and the motherboard may support higher power PCIe devices in the future.

Referring to FIG. 7, FIG. 7 is a flowchart of steps of a power supply method for an add-in card provided in some embodiments of the present disclosure. The method can include following steps:

step 701, a microcontroller unit sends working voltage parameters for an add-in card to a baseboard management controller when a host device carrying a motherboard device is not turned on;

step 702, the baseboard management controller selects a power supply type for the add-in card in response to receiving the working voltage parameters; and step 703, the baseboard management controller controls the motherboard device to supply power to the add-in card based on the power supply type when the host device is turned on.

The method embodiments are substantially similar to the power supply system embodiments, and thus the description is relatively simple, and the relevant points can be found in part of the description of the power supply system embodiments.

It should be noted that for the sake of simplicity, the method embodiments are described as a series of action combinations. However, a person skilled in the art should be aware that some embodiments of the present disclosure are not limited by the order of the described actions, as certain steps may be performed in other orders or simultaneously according to some embodiments of the present disclosure. Secondly, a person skilled in the art should also be aware that some embodiments described in the specification are preferred embodiments, and the actions involved are not necessarily necessary for some embodiments of the present disclosure.

Referring to FIG. 8. FIG. 8 is a block diagram of a structure of a power supply apparatus for an add-in card provided in some embodiments of the present disclosure. The apparatus can include following modules:

working voltage parameter sending module 801 configured to send, by the microcontroller unit, working voltage parameters for the add-in card to the baseboard management controller when the host device carrying the motherboard device is not turned on;

a power supply type selection module 802 configured to select, by the baseboard management controller, a power supply type for the add-in card in response to receiving the working voltage parameters; and an add-in card power supply module 803 configured to control, by the baseboard management controller, the motherboard device to supply power to the add-in card based on the power supply type when the host device is turned on.

The apparatus embodiments are substantially similar to the method embodiments, and thus the description is relatively simple, and the relevant points can be found in part of the description of the method embodiments.

Some embodiments of the present disclosure further disclose a server, where the server is configured with a motherboard device, the motherboard device is configured with a baseboard management controller, the motherboard device has an add-in card, the add-in card is configured with a microcontroller unit, the baseboard management controller is connected to the microcontroller unit via a system management bus, the microcontroller unit is configured to send working voltage parameters for the add-in card to the baseboard management controller when the server is not turned on: the baseboard management controller is configured to receive the working voltage parameters and select a power supply type for the add-in card; and the baseboard management controller is further configured to control the motherboard device to supply power to the add-in card based on the power supply type when the server is turned on.

The server embodiments are substantially similar to the power supply system embodiments, and thus the description is relatively simple, and the relevant points can be found in part of the description of the power supply system embodiments.

In addition, some embodiments of the present disclosure further provide an electronic device, including: a processor, a memory and a computer program stored in the memory and executable on the processor, where the computer program, when executed by the processor, causes the processor to implement various processes of the power supply method for add-in card in the foregoing embodiments, and can achieve the same technical effects. To avoid repetition, details are not described herein again.

Some embodiments of the present disclosure further provide a non-transitory readable storage medium, on which a computer program is stored, where the computer program, when executed by a processor, causes the processor to implement various processes of the power supply method for add-in card in the foregoing embodiments, and can achieve the same technical effects. To avoid repetition, details are not described herein again. For example, the non-transitory readable storage medium includes a read-only memory (ROM), a random access memory (RAM), a magnetic disk, an optical disc, or the like.

FIG. 9 is a schematic diagram of a hardware structure of an electronic device for implementing some embodiments of the present disclosure.

The electronic device 900 includes, but is not limited to, a radio frequency unit 901, a network module 902, an audio output unit 903, an input unit 904, a sensor 905, a display unit 906, a user input unit 907, an interface unit 908, a memory 909, a processor 910 and a power supply 911. It can be understood by a person skilled in the art that the structure of the electronic device shown in FIG. 9 does not constitute a limitation on the electronic device, and the electronic device can include more or less components than shown in the drawings, or combine some components, or arrange different components. In some embodiments of the present disclosure, the electronic device includes, but is not limited to, a mobile phone, a tablet computer, a notebook computer, a palmtop computer, a vehicle-mounted terminal, a wearable device, a pedometer, or the like.

It should be understood that in some embodiments of the present disclosure, the radio frequency unit 901 may be configured to receive and transmit information, or to receive and transmit a signal in a call process, and specially, after receiving downlink data from a base station, transmit the downlink data to the processor 910 for processing; and also transmit uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may also communicate with a network and other devices via a wireless communication system.

The electronic device provides wireless broadband Internet access for a user by using the network module 902, for example, helping the user send and receive e-mails, browse web pages, and access streaming media.

The audio output unit 903 may convert audio data received by the radio frequency unit 901 or the network module 902 or stored in the memory 909 into an audio signal and output the audio signal as a sound. In addition, the audio output unit 903 may further provide audio output (for example, a call signal received sound or a message received sound) related to a specific function performed by the electronic device 900. The audio output unit 903 includes a speaker, a buzzer, a telephone receiver, and the like.

The input unit 904 is configured to receive audio or video signals. The input unit 904 can include a graphics processing unit (GPU) 9041 and a microphone 9042. The graphics processing unit 9041 processes image data of a static picture or a video obtained by an image capture apparatus (for example, a camera) in a video capture mode or an image capture mode. A processed image frame may be displayed on the display unit 906. The image frame processed by the graphics processing unit 9041 may be stored in the memory 909 (or another storage medium) or transmitted via the radio frequency unit 901 or the network module 902. The microphone 9042 is capable of receiving sounds and processing such sounds into audio data. The processed audio data can be converted, in a telephone call mode, into a format that can be transmitted via the radio frequency unit 901 to a mobile communication base station.

The electronic device 900 further includes at least one sensor 905, for example, an optical sensor, a motion sensor, and other sensors. In some embodiments, the optical sensor includes an ambient light sensor and a proximity sensor. The ambient light sensor may adjust brightness of a display panel 9061 based on intensity of ambient light, and the proximity sensor may turn off the display panel 9061 and/or backlight when the electronic device 900 moves close to an ear. As a type of motion sensor, an accelerometer sensor can detect magnitudes of accelerations in all directions (usually three axes), can detect a magnitude and a direction of gravity when in a static state, and can be applied to posture recognition (for example, screen switching between portrait and landscape, related games, and magnetometer posture calibration) of the electronic device, functions related to vibration recognition (for example, a pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 can include the display panel 9061. The display panel 9061 may be configured in a form of a liquid crystal display (LCD), an organic light-emitting diode (OLED), or the like.

The user input unit 907 may be configured to: receive input digit or character information and generate key signal input related to user settings and function control of the electronic device. In some embodiments, the user input unit 907 includes a touch panel 9071 and other input devices 9072. The touch panel 9071 is also referred to as a touch-screen, and may collect a touch operation of the user on or near the touch panel (for example, an operation performed on or near the touch panel 9071 by the user by using any appropriate object or accessory such as a finger or a stylus). The touch panel 9071 can include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, transmits the touchpoint coordinates to the processor 910, and can receive a command transmitted by the processor 910 and execute the command. In addition, the touch panel 9071 may be implemented in a plurality of forms, for example, as a resistive, a capacitive, an infrared, or a surface acoustic wave touch panel. The user input unit 907 may further include other input devices 9072 in addition to the touch panel 9071. In some embodiments, the other input devices 9072 can include, but are not limited to, a physical keyboard, a function button (for example, a volume button or a power on/off button), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. It can be understood that in one embodiment, the touch panel 9071 and the display panel 9061 serve as two separate components to implement input and output functions of the electronic device. However, in some embodiments, the touch panel 9071 and the display panel 9061 may be integrated to implement the input and output functions of the electronic device, and this is not limited herein.

The interface unit 908 is an interface for connecting an external apparatus to the electronic device 900. For example, the external apparatus can include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 908 may be configured to receive an input (for example, data information or power) from an external apparatus and transmit the received input to one or more elements in the electronic device 900, or may be configured to transmit data between the electronic device 900 and the external apparatus.

The memory 909 may be configured to store software programs and various data. The memory 909 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 909 can include a high-speed random access memory, or may further include a non-volatile memory, for example, at least one magnetic disk storage device, flash memory, or other volatile solid-state storage devices.

The processor 910 is a control center of the electronic device, uses various interfaces and lines to connect all parts of the entire electronic device, and performs various functions and data processing of the electronic device by running or executing the software program and/or module stored in the memory 909 and invoking data stored in the memory 909, thereby performing overall monitoring on the electronic device. The processor 910 can include one or more processing units. In some embodiments of the present disclosure, the processor 910 may integrate an application processor and a modem processor. The application processor mainly processes the operating system, a user interface, an application program, and the like. The modem processor mainly processes wireless communication. In some embodiments, it can be understood that the modem processor may be not integrated in the processor 910.

The electronic device 900 may further include a power supply 911 (for example, a battery) supplying power to the components. In some embodiments of the present disclosure, the power supply 911 may be logically connected to the processor 910 through a power management system, so that functions such as charge management, discharge management, and power consumption management are implemented by using the power management system.

In addition, the electronic device 900 includes some functional modules that are not shown. Details are not described herein.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the descriptions of the foregoing embodiments, a person skilled in the art can clearly understand that the method in the foregoing embodiments may be implemented by software in combination with a necessary general hardware platform. In some embodiments, the method in the foregoing embodiments may be implemented by hardware. However, in many situations, the former is an example implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in some embodiments of the present disclosure.

Figure 10:
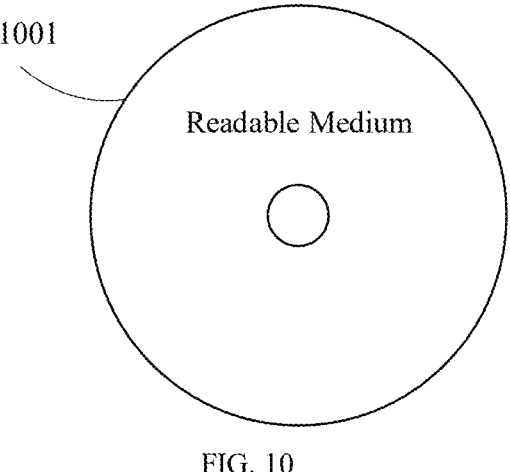
FIG. 10 is a schematic diagram of a non-transitory readable storage medium provided in some embodiments of the present disclosure.

As shown in FIG. 10, in other embodiments provided by the present disclosure, there is further provided a non-transitory readable storage medium 1001. The non-transitory readable storage medium 1001 stores instructions, when the instructions run on a computer, cause the computer to execute the power supply method for add-in card in the foregoing embodiments.

The foregoing describes some embodiments of the present disclosure with reference to the accompanying drawings. However, the present disclosure is not limited to the foregoing specific embodiments. The foregoing specific embodiments are merely illustrative rather than restrictive. As instructed by the present disclosure, a person of ordinary skill in the art may develop many other manners without departing from principles of the present disclosure and the protection scope of the claims, and all such manners fall within the protection scope of the present disclosure.

A person of ordinary skill in the art may be aware that the various exemplary units and algorithm steps described in conjunction with some embodiments disclosed in some embodiments of the present disclosure can be implemented by electronic hardware, or a combination of computer software and electronic hardware. Whether the functions are executed by hardware or software depends on particular applications and design constraint conditions of the technical solutions. A person skilled in the art can use different methods to implement the described functions for every particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In some embodiments provided in the present disclosure, it should be understood that the disclosed apparatus and method may be implemented in other manners. For example, the described apparatus embodiment is merely an example. For example, division into the units is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions of some embodiments.

In addition, functional units in some embodiments of the present disclosure may be integrated into one unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the method described in some embodiments of the present disclosure. The storage medium can include, but is not limited to, any medium that can store program code, for example, a USB flash disk, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A power supply system for a high-speed add-in card, wherein the power supply system comprises a motherboard device mounted on a host device, a baseboard management controller configured on the motherboard device, and a microcontroller unit configured on the high-speed add-in card, wherein the high-speed add-in card is configured on the host device, and the baseboard management controller is connected to the microcontroller unit via a system management bus;

the power supply system is configured to control the microcontroller unit to send working voltage parameters for the high-speed add-in card to the baseboard management controller when the host device carrying the motherboard device is not turned on; and the baseboard management controller is configured to receive the working voltage parameters and select a power supply type for the high-speed add-in card, and control the motherboard device to supply power to the high-speed add-in card based on the power supply type when the host device is turned on.

2. The power supply system according to claim 1, wherein the motherboard device is provided with one or more peripheral component interconnect express slots for the high-speed add-in card, the motherboard device is provided with a power supply unit power supply circuit, and the high-speed add-in card is provided with an add-in card voltage conversion circuit;

each of the one or more peripheral component interconnect express slots is configured to connect the power supply unit power supply circuit and the add-in card voltage conversion circuit to form a first circuit when the high-speed add-in card is plugged into the motherboard device through the peripheral component interconnect express slot, and the add-in card voltage conversion circuit is provided with a first step-down module; and the motherboard device is configured to provide a working voltage for a working unit of the high-speed add-in card through the first circuit.

3. The power supply system according to claim 2, wherein the power supply unit power supply circuit comprises a second circuit, wherein the baseboard management controller is configured to control the second circuit to be closed when the power supply type is a first target voltage; and the motherboard device is configured to output the first target voltage to the high-speed add-in card through the second circuit based on the one or more peripheral component interconnect express slots when the second circuit is closed.

4. The power supply system according to claim 3, wherein the high-speed add-in card is configured with an auxiliary power supply connector, wherein the auxiliary power supply connector is configured to be connected to the second circuit when the second circuit is closed; and the motherboard device is configured to output the first target voltage to the auxiliary power supply connector through the second circuit.

5. The power supply system according to claim 4, wherein the power supply unit power supply circuit comprises a third circuit, wherein the baseboard management controller is configured to control the third circuit to be closed when the power supply type is a second target voltage; and the motherboard device is configured to output the second target voltage to the high-speed add-in card through the third circuit based on the one or more peripheral component interconnect express slots when the third circuit is closed.

6. The power supply system according to claim 5, wherein the auxiliary power supply connector is configured to be connected to the third circuit when the third circuit is closed; and the motherboard device is configured to output the second target voltage to the auxiliary power supply connector through the third circuit.

7. The power supply system according to claim 6, wherein the motherboard device is configured with a single-pole double-throw relay, and the single-pole double-throw relay is configured to control the second circuit or the third circuit to be closed.

8. The power supply system according to claim 7, wherein the second circuit and the third circuit are supplied with a voltage by a same power supply unit, the single-pole double-throw relay is connected to the power supply unit, and the second circuit is provided with a second step-down module.

9. The power supply system according to claim 8, wherein the baseboard management controller is connected to the single-pole double-throw relay through a single-tube transistor amplification circuit;

the baseboard management controller is configured to send a first control signal to the single-pole double-throw relay through the single-tube transistor amplification circuit; and the single-pole double-throw relay is configured to control the second circuit to be closed in response to the first control signal.

10. The power supply system according to claim 9, wherein the baseboard management controller is configured to send a second control signal to the single-pole double-throw relay through the single-tube transistor amplification circuit; and the single-pole double-throw relay is configured to control the third circuit to be closed in response to the second control signal.

11. The power supply system according to claim 10, wherein the baseboard management controller is configured to generate a power supply attribute query command, and send the power supply attribute query command to the microcontroller unit;

the microcontroller unit is configured to generate response information for expressing that the high-speed add-in card conforms to the high voltage power supply attribute in response to the power supply attribute query command; and the baseboard management controller is configured to send the second control signal to the single-pole double-throw relay through the single-tube transistor amplification circuit when receiving the response information.

12. The power supply system according to claim 11, wherein the baseboard management controller is configured to send the first control signal to the single-pole double-throw relay through the single-tube transistor amplification circuit when the response information is not received.

13. The power supply system according to claim 12, wherein the microcontroller unit is configured to perform initialization operation after sending the working voltage parameters for the high-speed add-in card to the baseboard management controller.

14. The power supply system according to claim 13, wherein the baseboard management controller is configured to generate other power supply attribute query commands for other high-speed add-in cards after sending feedback information for the response information to the microcontroller unit, and send the other power supply attribute query commands to the other high-speed add-in cards.

15. The power supply system according to claim 10, wherein the power supply unit power supply circuit comprises a fourth circuit for the baseboard management controller and the microcontroller unit, wherein the first circuit, the second circuit, the third circuit and the fourth circuit are supplied with the voltage by the same power supply unit; and third step-down modules are arranged between the baseboard management controller and the power supply unit and between the one or more peripheral component interconnect express slots with the power supply unit on the fourth circuit, and the power supply unit provides a standby voltage to the baseboard management controller and the microcontroller unit through the fourth circuit.

16. The power supply system according to claim 1, wherein the motherboard device is a motherboard device conforming to open computing standards.

17. A power supply method for a high-speed add-in card, wherein the high-speed add-in card is configured on a host device carrying a motherboard device, the high-speed add-in card is configured with a microcontroller unit, and the motherboard device is configured with a baseboard management controller, and the baseboard management controller is connected to the microcontroller unit via a system management bus, comprising:

sending, by the microcontroller unit, working voltage parameters for the high-speed add-in card to the baseboard management controller when the host device carrying the motherboard device is not turned on;

selecting, by the baseboard management controller, a power supply type for the high-speed add-in card in response to receiving the working voltage parameters; and controlling, by the baseboard management controller, the motherboard device to supply power to the high-speed add-in card based on the power supply type when the host device is turned on.

18. An electronic device, comprising: a processor, a communication interface, a memory and a communication bus, wherein the processor, the communication interface and the memory communicate with each other through the communication bus;

the memory is configured to store computer programs; and the processor is configured to implement the method according to claim 17 when executing the computer programs stored on the memory.

19. A non-transitory readable storage medium storing instructions, wherein the instructions, when executed by one or more processors, cause the processors to perform the method according to claim 17.

20. A server, wherein the server is configured with a motherboard device, the motherboard device is configured with a baseboard management controller, the motherboard device has a high-speed add-in card, the high-speed add-in card is configured with a microcontroller unit, the baseboard management controller is connected to the microcontroller unit via a system management bus, the microcontroller unit is configured to send working voltage parameters for the high-speed add-in card to the baseboard management controller when the server is not turned on; the baseboard management controller is configured to receive the working voltage parameters and select a power supply type for the high-speed add-in card; and the baseboard management controller is further configured to control the motherboard device to supply power to the high-speed add-in card based on the power supply type when the server is turned on.

* * * * *